US010321700B2

(12) United States Patent
Cocchi et al.

(10) Patent No.: US 10,321,700 B2
(45) Date of Patent: Jun. 18, 2019

(54) MACHINE FOR MAKING LIQUID OR SEMI-LIQUID PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernuscosul (IT)

(*) Notice: Subject to any disclaimer, the term of this patent is extended or adjusted under 35 U.S.C. 154(b) by 0 days.

(21) Appl. No.: 15/723,230

(22) Filed: Oct. 3, 2017

(65) Prior Publication Data
US 2018/0098553 A1 Apr. 12, 2018

(30) Foreign Application Priority Data

Oct. 7, 2016 (IT) .................. 102016000100948

(51) Int. Cl.
A23G 9/04 (2006.01)
A23G 9/12 (2006.01)
(Continued)

(52) U.S. Cl.
CPC .............. A23G 9/12 (2013.01); A23G 9/045 (2013.01); A23G 9/18 (2013.01); A23G 9/222 (2013.01);
(Continued)

(58) Field of Classification Search
CPC .......... A23G 9/12; A23G 9/045; A23G 9/222; A23G 9/16; A23G 9/224; A23G 9/28
See application file for complete search history.

(56) References Cited

U.S. PATENT DOCUMENTS 3,517,524 A * 6/1970 Fiedler .................. A23G 9/045
   222/129.1
3,818,716 A * 6/1974 Carpigiani ............... A23G 9/16
   62/178
(Continued)

FOREIGN PATENT DOCUMENTS

EP 2277386 A2 1/2011
EP 2478774 A1 7/2012
(Continued)

OTHER PUBLICATIONS

Italian Search Report dated Jun. 9, 2017 for counterpart Italian Application No. IT 10201600100948.

Primary Examiner — Cassey D Bauer
(74) Attorney, Agent, or Firm — Shuttleworth & Ingersoll, PLC; Timothy J. Klima

(57) ABSTRACT

A machine for making liquid or semi-liquid products, including: a first processing container for processing a basic liquid or semi-liquid product and defining a processing chamber; a cooling cylinder mounted inside the first container; a rotary stirrer mounted inside the first container and outside the cooling cylinder; a thermal treatment system provided with at least a first exchanger associated with the cooling cylinder; a second processing container; a connecting duct designed to connect the second processing container to the first processing container to transfer the basic liquid or semi-liquid product from the second processing container to the first processing container; a dispensing device associated with the first processing container to deliver the liquid or semi-liquid product to the outside.

9 Claims, 5 Drawing Sheets

(51) Int. Cl.
  *A23G 9/18*  (2006.01)
  *A23G 9/22*  (2006.01)
  *A23G 9/28*  (2006.01)
  *A23G 9/30*  (2006.01)

(52) U.S. Cl.
  CPC .............. *A23G 9/224* (2013.01); *A23G 9/228* (2013.01); *A23G 9/28* (2013.01); *A23G 9/30* (2013.01)

(56) References Cited

U.S. PATENT DOCUMENTS

| | | | |
|---|---|---|---|
| 4,653,281 A * | 3/1987 | Van Der Veer | A23G 9/045 366/144 |
| 5,201,861 A | 4/1993 | Menzel | |
| 2008/0202130 A1 * | 8/2008 | Kadyk | A23G 9/045 62/68 |
| 2012/0055189 A1 | 3/2012 | Sipp et al. | |
| 2012/0223094 A1 * | 9/2012 | Rickard, Jr. | A23G 9/045 222/1 |

FOREIGN PATENT DOCUMENTS

| | | |
|---|---|---|
| EP | 2805620 A1 | 11/2014 |
| EP | 2932855 A1 | 10/2015 |
| EP | 3028581 A1 | 6/2016 |
| EP | 3045048 A1 | 7/2016 |

\* cited by examiner

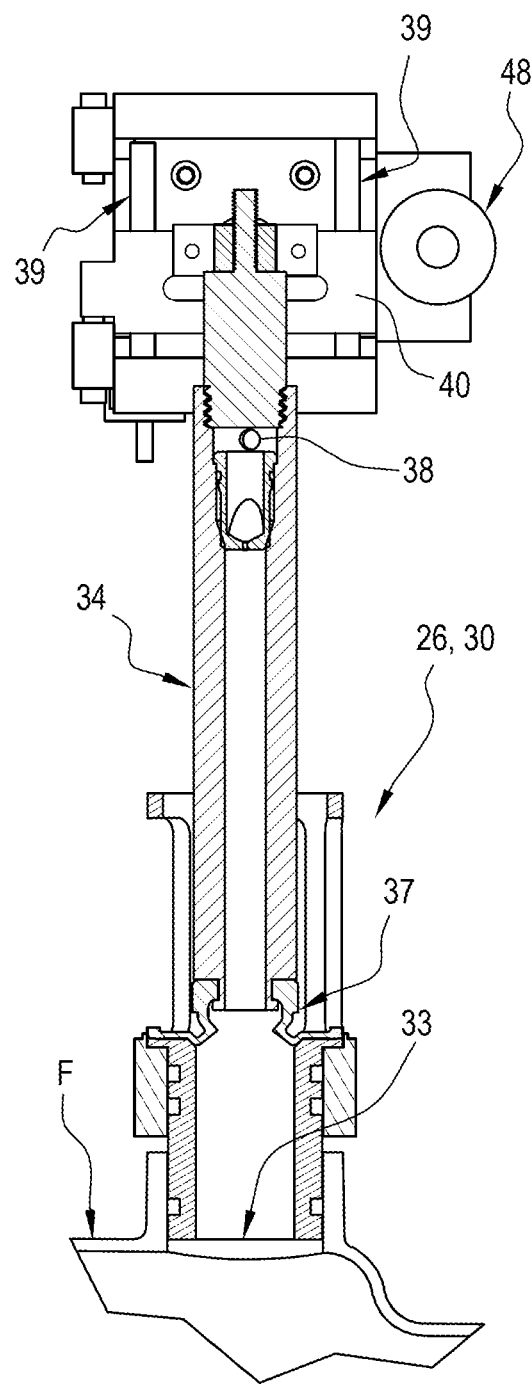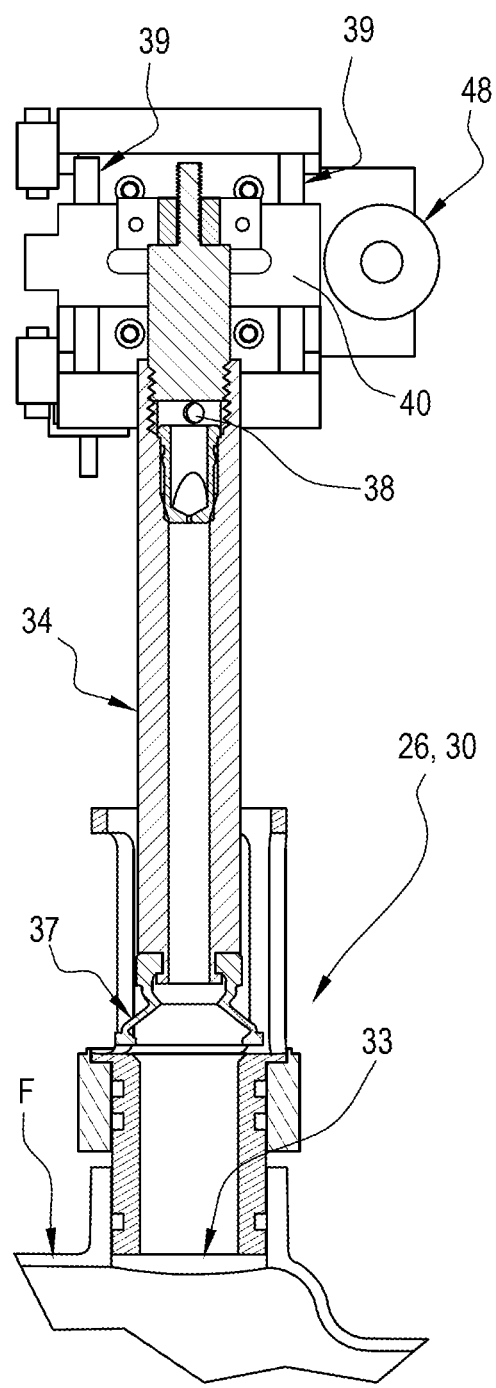

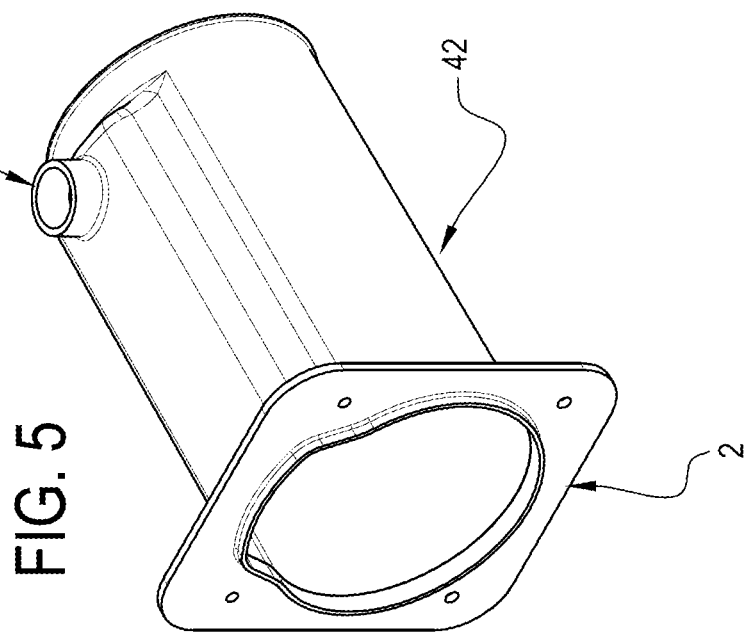
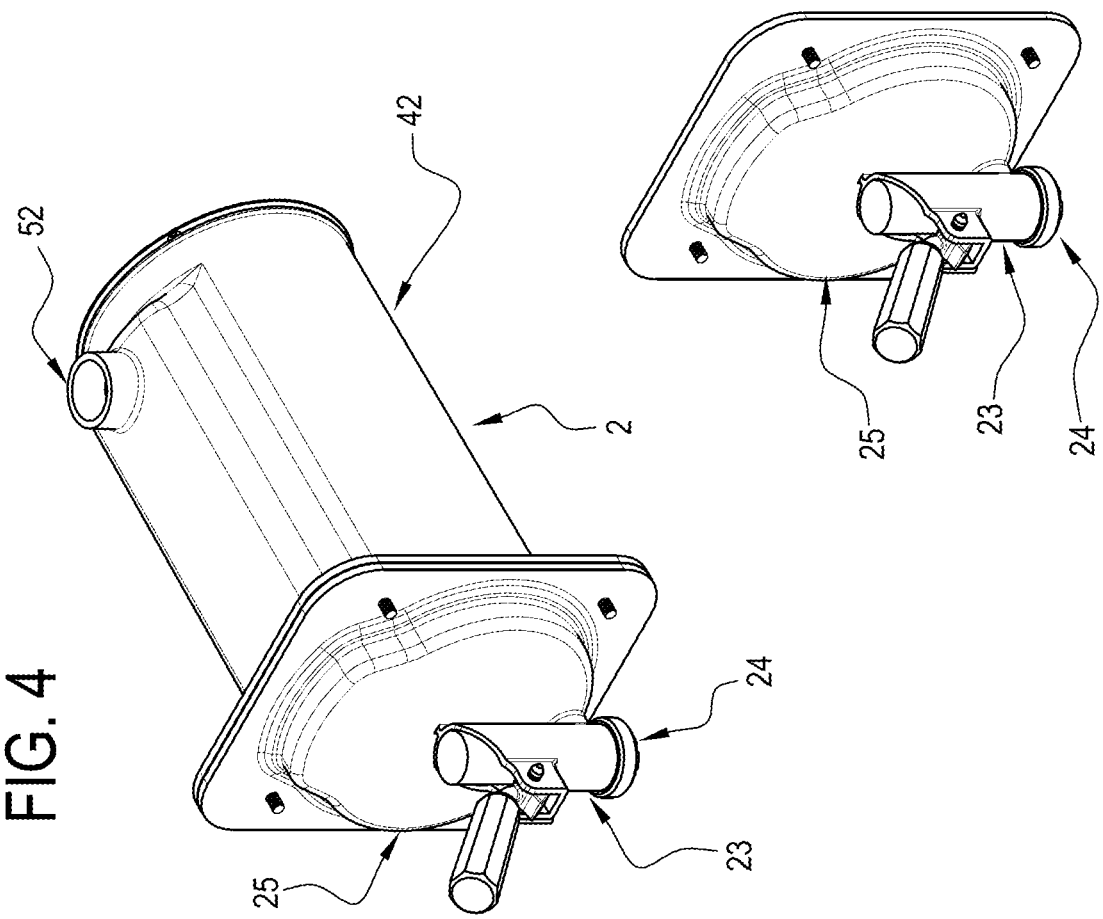

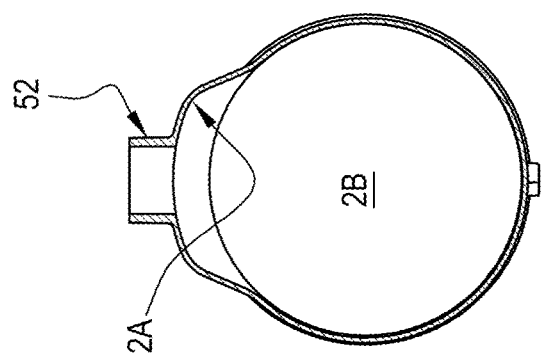
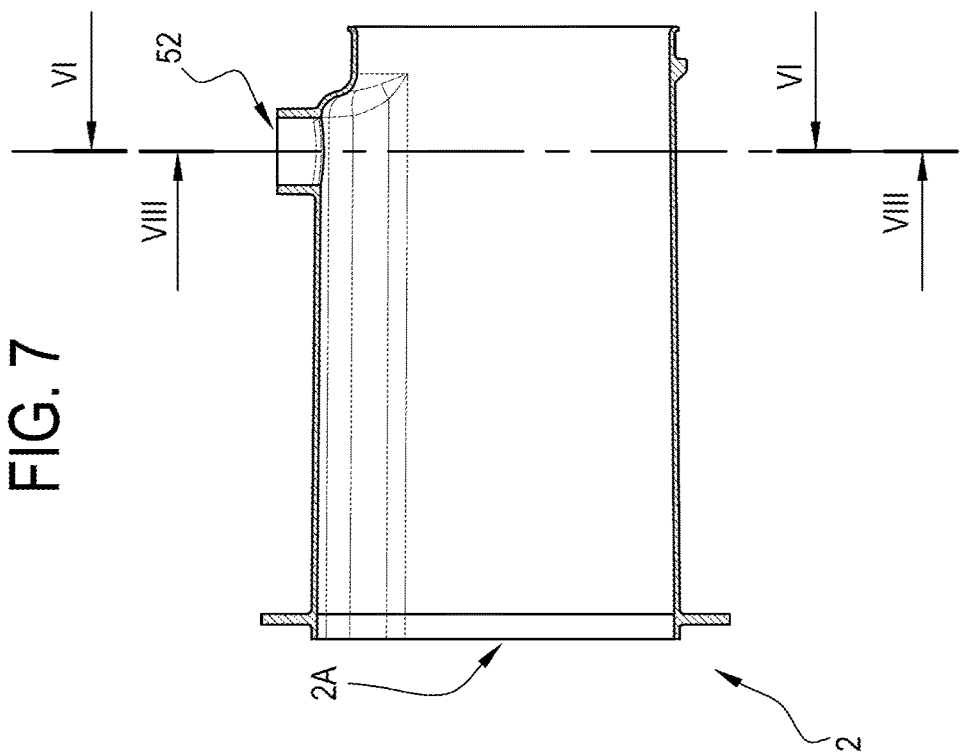
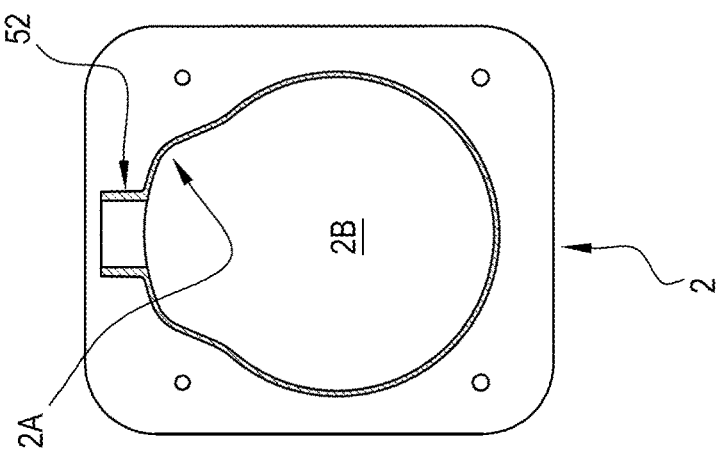

MACHINE FOR MAKING LIQUID OR SEMI-LIQUID PRODUCTS

This application claims priority to Italian Patent Application IT 102016000100948 filed Oct. 7, 2016, the entirety of which is incorporated by reference herein.

BACKGROUND OF THE INVENTION

This invention relates to a machine for making liquid or semi-liquid products.

A strongly felt need in the trade concerned is that of being able to make machines for making liquid and/or semi-liquid food products which can make a wide range of different products (for example, soft or traditional ice cream).

Generally speaking, in the traditional ice cream trade, machines for making liquid or semi-liquid products allow making an extremely limited range of ice cream types.

SUMMARY OF THE INVENTION

The aim of this invention is to provide a machine for making a liquid or semi-liquid product, specifically ice cream, and which allows the above mentioned need to be met.

Another aim of this invention is to provide a machine for making a liquid or semi-liquid product and whose operation is particularly simple and effective.

According to the invention, this aim is achieved by a machine for making liquid or semi-liquid products and comprising the technical features set out in one or more of the appended claims.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate a preferred, non-limiting embodiment of the invention and in which:

FIGS. 2 and 3 are respective schematic views of a detail of the machine of FIG. 1, forming the object of this invention;

FIGS. 4 to 8 are respective schematic views of a detail of the machine of FIG. 1, forming the object of this invention;

DESCRIPTION OF THE PREFERRED EMBODIMENTS

Figure 1:
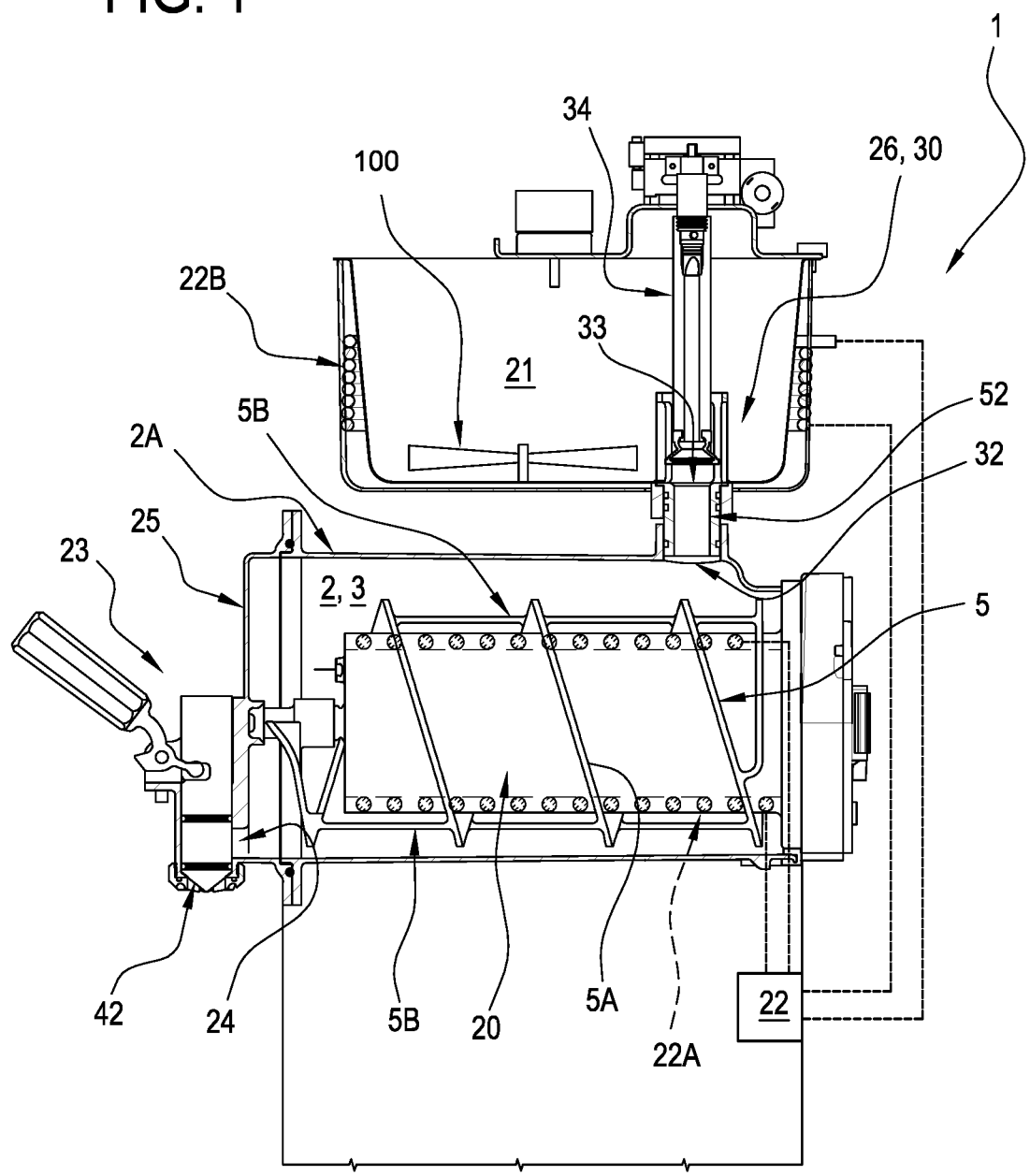
FIG. 1 is a schematic view of a first embodiment of a machine according to this invention.

With reference to the accompanying drawings, the numeral 1 denotes a machine forming the object of this invention, for making liquid or semi-liquid products.

The machine is preferably adapted to make ice cream (artisan gelato or soft ice cream) or products for the ice cream trade (granitas, sorbets, etc.).

In the context of the invention, the term "ice cream" is used to mean a food preparation which is based on milk or milk-derived products and to which fruit, aromatics or other ingredients are added to obtain different flavors.

The machine 1 for making liquid or semi-liquid products comprises:

a first processing container 2 for processing a basic liquid or semi-liquid product and defining a processing chamber 3 (or batch freezing chamber 3);

a cooling cylinder 20 mounted inside the first container 2;

a rotary stirrer 5 mounted inside the chamber 3 (that is, inside the first processing container 2) and outside the cooling cylinder 20;

a thermal treatment system 22 provided with at least a first exchanger associated with the cooling cylinder 20 (mounted inside the cooling cylinder 20 to cool and/or heat an outside surface of the cooling cylinder 20);

a second processing container 21;

a connecting duct 52 designed to connect the second processing container 21 to the first processing container 2 to transfer the basic liquid or semi-liquid product from the second processing container 21 to the first processing container 2;

a dispensing device 23 associated with the first processing container 2 to deliver the (suitably processed) liquid or semi-liquid product to the outside (of the machine).

According to another aspect, the first processing container 2 for processing a basic liquid or semi-liquid product comprises a radially protruding longitudinal portion 2A defining a zone (between the front section and the rear section of the machine) for recirculating the basic liquid or semi-liquid product when the rotary stirrer 5 is set in rotation.

In other words, the portion 2A defines, along the main direction of extension of the processing container 2, a radial protrusion which also extends radially and along the main direction of extension of the processing container 2.

It should be noted that the radially protruding longitudinal portion 2A allows the food product inside the first container 2 to be recirculated by pushing it axially, that is, longitudinally, by effect of the rotational motion of the rotary stirrer 5 (thanks to at least one helical portion of the rotary stirrer 5).

In effect, the longitudinal portion 2A defines a compartment within which the product can move (longitudinally, that is, along the axis of the rotary stirrer 5, from the front section to the rear section) under the pushing action of the rotary stirrer 5.

This recirculating action allows optimum, uniform processing of the product, preventing the product from accumulating in the front zone (which would result in non-uniform temperature).

It should be noted that the heat exchanger 22A is mounted inside the cooling cylinder 20.

Preferably, the cooling cylinder 20 is made of metallic material.

According to another aspect, the first processing container 2 has, in transverse cross section, a first portion 2B which is substantially circular and a second portion 2A, connected thereto, which is irregular in shape (that is, the aforementioned radially protruding, longitudinal portion 2A) and which defines an external extension of the first portion 2B.

According to another aspect, the rotary stirrer 5 has a helically extending portion 5A.

The stirrer 5 preferably also comprises a pair of stiffening elements 5B, 5B' extending longitudinally and coupled to the helical portion 5A in order to stiffen the helical portion 5A.

According to another aspect, the second container 21 is a tub-like container.

Preferably, the second container 21 is openable at the top.

It should be noted that the second container 21, too, has a stirrer 100 mounted in it to stir the liquid or semi-liquid product present in the second container 21.

According to yet another aspect, the machine 1 comprises a second heat exchanger 22B associated with the second container 21.

Also, according to another aspect, the machine 1 comprises a shutoff valve 26 which can close the connecting duct 52 for connecting the second processing container 21 to the first container 2 and which thus allows or prevents the basic liquid or semi-liquid product to move from the second container 21 to the first container 2.

Described below is the shutoff valve 26 according to the embodiment illustrated in the accompanying drawings (see FIGS. 1 and 2 in particular).

The machine 1 comprises a transfer device 30 for transferring the basic liquid or semi-liquid product from the second container 21 to the first container 2.

The transfer device 30 comprises the duct 52 connecting the second container 21 to the first container 2.

The first container 2 has a first opening 32 made in it (the first opening 32 being preferably, but not necessarily, made in the radially protruding, longitudinal portion 2A).

The second container 21 has a second opening 33 made in it (the second opening 33 being preferably, but not necessarily, made on the bottom F of the second container 21).

The connecting duct 52 connects the first opening 32 to the second opening 33.

It should be noted that there is a further duct 34 located inside the second container 21.

The further duct 34 is internally hollow, that is to say, it has an internal cavity passing longitudinally through it.

The further duct 34 is movable vertically between a shutoff position, where it closes the connection between the second container 21 and the first container 2 (stopping on the bottom F of the second container 21 to close the second opening 33), and an open position, where the connection between the second container 21 and the first container 2 is open.

It should also be noted that the further duct 34 has, at the bottom of it, a radially external sealing zone (this sealing zone being preferably defined by a gasket 37).

It should be noted that the gasket 37 is preferably internally hollow so that it can establish fluid communication, through its internal cavity, with the internal cavity of the duct 34.

It should be noted that the duct 34 is movable and defines the aforementioned shutoff valve 26 (the gasket 37, together with the duct 34, inhibits or establishes the connection between the second container 21 and the first container 2).

It should be noted that air is made to pass through the internal cavity of the duct 34.

In effect, at the top of it, the duct 34 has an opening 38 which allows air into the cavity of the duct 34 itself.

The machine 1 also comprises an actuator 48 adapted to open and close the shutoff valve 26.

More specifically, in the embodiment illustrated in the accompanying drawings, the actuator 48 operates on the further duct 34 to allow movement (vertical) between the shutoff position for closing the passage of the basic liquid from the second container 21 to the first container 2 (through the connecting duct 52) and the open position for opening the passage of the basic liquid from the second container 21 to the first container 2 (through the connecting duct 52).

More precisely, the actuator 48 comprises a motor.

It should be noted that the actuator 48 also comprises a guide 39, more preferably, a pair of guides 39, and a slide 40 movably coupled to the guide 39.

It should be noted that the further duct 34 is connected (integrally) to the slide 40.

The guides 39 (or the guide 39 if there is only one) extend vertically.

The guides 39 are preferably connected integrally to the frame of the machine 1.

The motor is kinematically connected to the slide 40 to allow it to move relative to the guides 39.

According to another aspect, the dispensing device 23 comprises an outlet duct 24 and a shutter 42, mounted movably in the outlet duct 24 to close it or leave it open.

It should be noted that the shutter 42 can be actuated manually or automatically.

In order to dispense the product, the shutter 42 is moved to the open position and, preferably, the rotary stirrer 5 is set in rotation.

It should be noted that according to another aspect, the processing container 2 comprises a front portion 25 which is removable to allow the container 2 to be cleaned.

According to this aspect, the container 2 comprises a longitudinal portion 42, to the front of which the removable portion 25 is coupled.

The front portion 25 is therefore uncoupled from the longitudinal portion 42 only to allow the inside of the container 2 to be cleaned when the container 2 is empty.

During normal use, the liquid or semi-liquid product is dispensed through the outlet duct 24.

Figure 9:
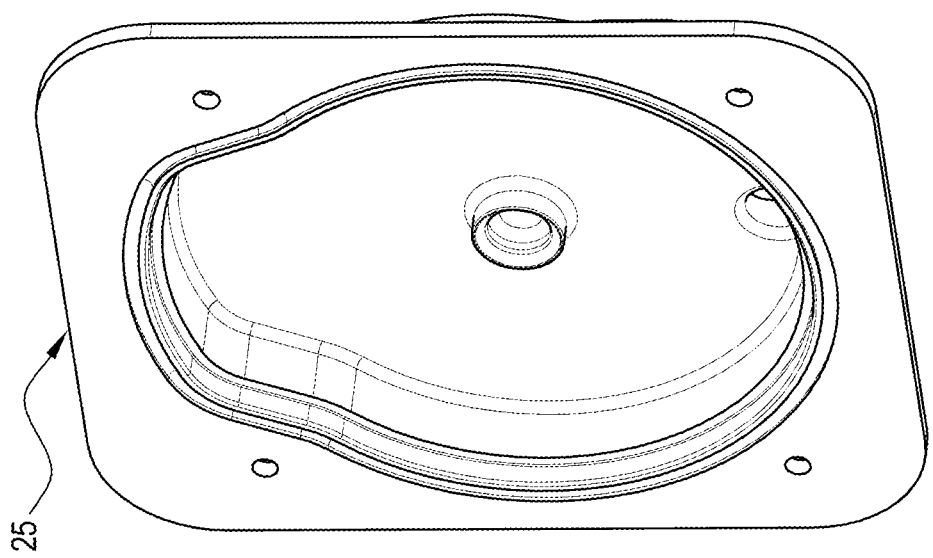
FIG. 9 shows a detail of a machine forming the object of this invention as shown in FIG. 1, according to a first embodiment.

FIG. 9 shows a first embodiment of the front portion 25 (door) which is removable to allow cleaning the processing container 2.

It should be noted that according to this embodiment, the front portion 25 (door) has a cavity made in it whose shape, in cross section, is substantially mirror symmetrical to that of the container 2, in cross section.

In other words, the cavity comprises a circular edge portion having a radially protruding region.

Figure 10:
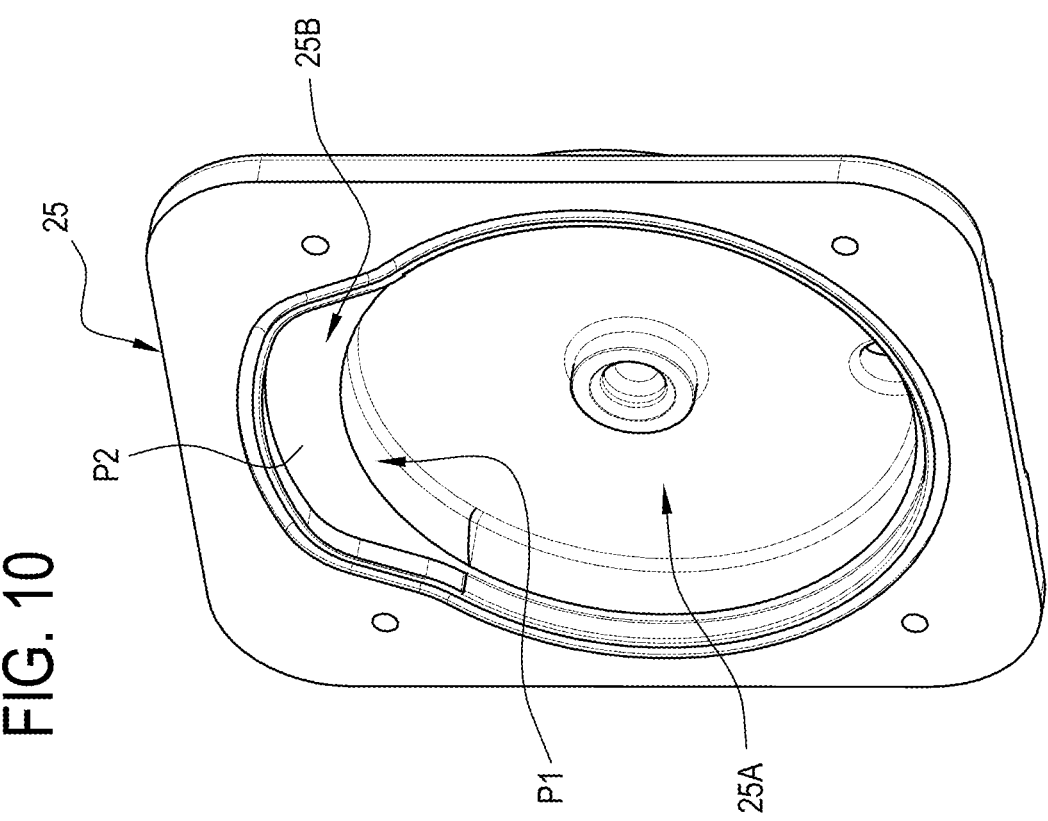
FIG. 10 shows a detail of a machine forming the object of this invention as shown in FIG. 1, according to a second embodiment.

FIG. 10 shows a second embodiment of the front portion 25 (door) which is removable to allow cleaning the processing container 2.

It should be noted that according to this embodiment, the front portion 25 (door) has a first cavity 25A made in it whose shape, in cross section, is circular. Also, the front portion 25 (door) comprises a second cavity 25B, less deep than, and separate from, the first cavity 25A. The second cavity 25B is separated from the first cavity 25A by a pair of walls P1, P2.

Advantageously provided according to the invention is a machine 1 which is particularly versatile and capable of producing a plurality of products.

It should be noted that the structure of the machine 1 is particularly innovative in that it is a combination of parts of traditional machines of the type used to make crushed ice drinks and parts of other traditional machines of the type used to make soft ice cream.

Advantageously, this type of machine is capable of making ice cream products (traditional and/or soft ice cream) as well as frozen products for the ice cream trade (e.g. granitas).

What is claimed is:

1. A machine for making liquid or semi-liquid products, comprising:
   a first processing container for processing a basic liquid or semi-liquid product and defining a processing chamber;

a cooling cylinder mounted inside the first processing container;

a rotary stirrer mounted inside the first processing container and outside the cooling cylinder;

a thermal treatment system including a first heat exchanger associated with the cooling cylinder;

a second processing container;

a stirrer mounted in the second processing container and configured to stir the basic liquid or semi-liquid product inside the second processing container;

a connecting duct connecting the second processing container to the first processing container to transfer the basic liquid or semi-liquid product from the second processing container to the first processing container;

a dispensing device including an outlet duct connected to the first processing container to deliver the processed liquid or semi-liquid product to an exterior of the machine;

a shutoff valve configured to close the connecting duct between the first processing container and the second processing container;

wherein the shutoff valve includes a further duct including an internal longitudinal through-cavity, the further duct being movable vertically between a closed position where the connecting duct is closed and an open position where the connecting duct is open.

2. The machine according to claim 1, wherein the first processing container comprises a radially protruding longitudinal portion defining, inside the processing chamber, a zone for recirculating the basic liquid and semi-liquid product when the rotary stirrer is set in rotation.

3. The machine according to claim 2, wherein the first processing container, in transvers cross section, has a first portion, which is partially circular, and a second portion, connected thereto and projecting outwards, which has an irregular shape matching the radially protruding longitudinal portion.

4. The machine according to claim 1, wherein the rotary stirrer comprises a van portion and a stiffening rib extending longitudinally and connected to the van portion to stiffen the vane portion.

5. The machine according to claim 1, wherein the dispensing device comprises a shutter, movably mounted in the outlet duct in order to close the outlet duct to prevent the processed liquid and semi-liquid product from being fed out of the first processing container or to leave the outlet duct open to allow the processed liquid and semi-liquid product to be fed out of the first processing container to the exterior of the machine.

6. The machine according to claim 1, wherein the first processing container comprises a front portion which is removable to allow cleaning of the first processing container.

7. The machine according to claim 1, comprising a gasket fitted to a bottom of the further duct and including an internal through-cavity in fluid connection with the internal longitudinal through-cavity of the further duct, the gasket being sized to come into abutment with a bottom of the second processing container when the further duct is in the closed position and to prevent passage of the basic liquid and semi-liquid product from the second processing container to the first processing container.

8. The machine according to claim 1, wherein the further duct includes an air inlet opening in fluid communication with the internal longitudinal through cavity.

9. The machine according to claim 1, wherein the further duct includes an air inlet opening in fluid communication with the internal longitudinal through-cavity.

* * * * *